United States Patent
Furukawa et al.

(10) Patent No.: US 10,885,205 B2
(45) Date of Patent: Jan. 5, 2021

(54) SECURE MULTIPARTY COMPUTATION

(71) Applicants: NEC Corporation Of America, Herzlia (IL); Bar-Ilan University, Ramat-Gan (IL)

(72) Inventors: Jun Furukawa, Tel-Aviv (IL); Yehuda Lindell, Givat Shmuel (IL)

(73) Assignees: NEC Corporation Of America, Herzlia (IL); Bar-Ilan University, Ramat-Gan (IL)

(*) Notice: Subject to any disclaimer, the term of this patent is extended or adjusted under 35 U.S.C. 154(b) by 177 days.

(21) Appl. No.: 16/175,960

(22) Filed: Oct. 31, 2018

(65) Prior Publication Data

US 2020/0134204 A1 Apr. 30, 2020

(51) Int. Cl.
*G06F 21/60* (2013.01)
*G06F 7/523* (2006.01)
*G06F 7/501* (2006.01)

(52) U.S. Cl.
CPC .......... *G06F 21/602* (2013.01); *G06F 7/501* (2013.01); *G06F 7/523* (2013.01)

(58) Field of Classification Search
CPC .................................................. G06F 21/602
See application file for complete search history.

(56) References Cited

U.S. PATENT DOCUMENTS

| | | | | |
|---|---|---|---|---|
| 10,490,107 B2* | 11/2019 | Furukawa | ........... | G09C 1/00 |
| 10,630,486 B2* | 4/2020 | Lindell | ........... | H04L 9/3255 |
| 2007/0116283 A1* | 5/2007 | Tuyls | ........... | H04L 9/008 |
| | | | | 380/255 |
| 2011/0176677 A1* | 7/2011 | Furukawa | ........... | H04L 9/3218 |
| | | | | 380/255 |
| 2016/0335440 A1* | 11/2016 | Clark | ........... | H04L 9/085 |
| 2017/0228547 A1* | 8/2017 | Smith | ........... | H04L 63/0428 |
| 2018/0114028 A1* | 4/2018 | Kafai | ........... | H04L 9/3239 |
| 2020/0084049 A1* | 3/2020 | Lindell | ........... | H04L 9/085 |
| 2020/0134204 A1* | 4/2020 | Furukawa | ........... | G06F 21/602 |

OTHER PUBLICATIONS

Raja Alhejaili, "Building Privacy-Preserving Health Record Using Secure Multiparty Computation", 51 pages. (Year: 2018).*

* cited by examiner

*Primary Examiner* — Ponnoreay Pich (57) ABSTRACT

A method for performing secure computations on records, comprising: receiving a request to apply an arithmetic computation on a record; assigning a respective partial record to each of a plurality of computational processes; instructing each of the computational processes sharing a computation scheme to perform the following: submitting the arithmetic computation to the computation scheme to assemble a processed partial record from the respective partial record components; instructing each of the plurality of computational processes to verify an integrity of at least one of the plurality of processed partial records by: broadcasting combined encryptions of one of the plurality of processed partial record components to all other of the plurality of computational processes and analyzing received combined encryptions to detect integrity in the other of the processed partial record components; and when the detected integrity is valid, calculating a response to the request by combining the received processed partial records.

11 Claims, 8 Drawing Sheets

SECURE MULTIPARTY COMPUTATION

FIELD AND BACKGROUND OF THE INVENTION

The present invention, in some embodiments thereof, relates to an improvement of secure multiparty computation and, more specifically, but not exclusively, to an improvement of secure four party computation with up to one dishonest party. A Secure multiparty computation (SMPC) protocol is a protocol where computations are performed by a number of parties (also known as processes), such that each party is assigned a private partial input (also known as a secret share) of an input, of which parts of may be communicated with other parties in order to perform a computation, such that the result of the computations of the parties is equivalent to applying the computation to the input. SMPC protocols often depend on verifiable secret sharing (VSS) schemes, which strive to ensure privacy of inputs, such that each party cannot infer inputs of other parties, and correctness of computations, such that dishonest parties are detected by other parties during or after computations. SMPC protocols differ according to levels of security achieved, defined by two types of dishonest parties that may be present. One type being semi honest parties, meaning dishonest parties follow a protocol, where dishonest activity only includes information gathering, and a second type being malicious parties, meaning dishonest parties may actively deviate from a protocol in order to mislead honest parties. Practical applications of SMPC protocols include, among other areas, implementations of electronic auctions, electronic voting, and privacy-preserving data mining.

SUMMARY OF THE INVENTION

It is an object of the present invention to provide a system and a method for secure multiparty computation.

The foregoing and other objects are achieved by the features of the independent claims. Further implementation forms are apparent from the dependent claims, the description and the figures.

According to a first aspect of the invention, a method for performing secure computations on records, comprising: receiving a request to apply an arithmetic computation on a record; assigning a respective partial record of a plurality of partial records of the record to each of a plurality of computational processes; instructing each of a plurality of computational processes sharing a computation scheme to perform the following: submitting the arithmetic computation to the computation scheme to assemble a processed partial record from the respective partial record components; instructing each of the plurality of computational processes to verify an integrity of at least one of the plurality of processed partial records by: broadcasting combined encryptions of one of the plurality of processed partial record components to all other of the plurality of computational processes and receiving combined encryptions of the other of the plurality of processed partial record components from the other of the plurality of computational processes, and analyzing the received combined encryptions to detect integrity in the other of the processed partial record components; and when the detected integrity is valid, receiving processed partial records from at least two of the plurality of computational processes, and calculating a response to the request by combining the received processed partial records.

According to a second aspect of the invention, a system for performing secure computations on records, comprising: at least one computation component adapted to perform the following: receiving a request to apply an arithmetic computation on a record; assigning a respective partial record of a plurality of partial records of the record to each of a plurality of computational processes; instructing each of a plurality of computational processes sharing a computation scheme to perform the following: submitting the arithmetic computation to the computation scheme to assemble a processed partial record from the respective partial record components; instructing each of the plurality of computational processes to verify an integrity of at least one of the plurality of processed partial records by: broadcasting combined encryptions of one of the plurality of processed partial record components to all other of the plurality of computational processes and receiving combined encryptions of the other of the plurality of processed partial record components from the other of the plurality of computational processes, and analyzing the received combined encryptions to detect integrity in the other of the processed partial record components; and when the detected integrity is valid, receiving processed partial records from at least two of the plurality of computational processes, and calculating a response to the request by combining the received processed partial records.

With reference to the first and second aspects, in a first possible implementation of the first and second aspects of the present invention, optionally, splitting the record in a random manner into a plurality of components, such that a summation of the plurality of components results in the record; setting each partial record to be a subset of the plurality of components such that no two assigned subsets are identical; wherein the plurality of components are arithmetically reconstructable from a union of any two of the assigned subsets; and assigning seeds of a plurality of seeds to each computational process of the plurality of computational processes.

With reference to the first and second aspects, or the first implementation of the first and second aspects, in a second possible implementation of the first and second aspects of the present invention, optionally, verifying integrity of at least one of the plurality of processed partial records further comprises: using assigned seeds of the plurality of seeds to generate a plurality of cryptographic keys and encryption factors;

instructing each of the plurality of computational processes to perform: computing a plurality of integrity terms such that each integrity term comprises summations of multiples of corresponding partial record components and respective generated cryptographic keys and encryption factors; broadcasting all computed integrity terms; receiving integrity terms; and verifying received integrity terms by verifying predetermined equations comprising of equations which compare corresponding generated and received integrity terms, and equations which compare summations of integrity terms.

With reference to the first and second aspects, or the first or second implementations of the first and second aspects, in a third possible implementation of the first and second aspects of the present invention, optionally, the arithmetic computation is computed by executing a logical circuit comprises having a plurality of gates; and a functionality of each of the plurality of gates consists of at least one of the following: a multiplication of an input by a scalar, a summation of two inputs, and a multiplication of two inputs.

With reference to the first and second aspects, or the first, second, or third implementations of the first and second aspects, in a fourth possible implementation of the first and second aspects of the present invention, optionally, further comprising: for each gate of the logical circuit which has a functionality of a multiplication of two inputs: multiplying all pairs of parts of two respective partial records in order to generate a set of multiplied pairs; using assigned seeds of the plurality of seeds to generate a set of encrypted terms comprising summations of multiplied pairs of the set of multiplied pairs and encryption factors; sharing encrypted terms between computational processes of the plurality of computational processes in a predetermined manner; assigning components of a processed partial record to be a set comprising generated and shared encrypted terms and summations of generated and shared encrypted terms.

With reference to the first and second aspects, or the first, second, third, or fourth implementations of the first and second aspects, in a fifth possible implementation of the first and second aspects of the present invention, the method of secure computation is applied to a logical circuit as follows: at each of a plurality of gates of the logical circuit, wherein an assigned record to the logical circuit is the record, and an output of each gate of the logical circuit, other than an output gate, is an assigned record for at least one gate of the logical circuit, instructing each of the plurality of computational processes to compute a processed partial record from a respective partial assigned record components, where each computation of the plurality of computational processes corresponds to a functionality of a respective gate, and following computations of the plurality of computational processes of processed partial records at the output gate, instructing each of the plurality of computational processes to verify an integrity of all of the plurality of processed partial records components computed at all of the plurality of gates of the logical circuit whose functionality comprises a multiplication of two inputs, by other computational processes of the plurality of computational processes.

With reference to the first and second aspects, or the first, second, third, fourth, or fifth implementations of the first and second aspects, in a sixth possible implementation of the first and second aspects of the present invention, optionally, the arithmetic computation is performed in a finite algebraic ring, and further comprising: computing a plurality of values depending on the size of the finite algebraic ring; for each of the plurality of values: verifying the integrity of all of the plurality of processed partial records components computed at all of the plurality of gates of the logical circuit whose functionality comprises a multiplication of two inputs, comprises generating cryptographic keys and encryption factors which are dependent on each value.

With reference to the first and second aspects, or the first, second, third, fourth, fifth, or sixth implementations of the first and second aspects, in a seventh possible implementation of the first and second aspects of the present invention, optionally, an amount of the plurality of computational processes is equal to four.

With reference to the first and second aspects, or the first, second, third, fourth, fifth, sixth, or seventh implementations of the first and second aspects, in an eighth possible implementation of the first and second aspects of the present invention, optionally, the computation scheme for each gate of the logical circuit which has a functionality of a multiplication of two inputs shares a total of six different encrypted terms by communication between computational processes.

With reference to the first and second aspects, or the first, second, third, fourth, fifth, sixth, seventh or eighth implementations of the first and second aspects, in an ninth possible implementation of the first and second aspects of the present invention, optionally, the computation scheme for each gate of the logical circuit which has a functionality of a multiplication of two inputs shares a total of five different encrypted terms by communication between computational processes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

The present invention, in some embodiments thereof, relates to an improvement of secure multiparty computation and, more specifically, but not exclusively, to an improvement of secure four party computation with up to one dishonest party.

According to some embodiments of the present invention there are provided systems and methods in which computational processes perform secure computations on records in a shared manner, and in which the computational processes, known herein as "processes", share information and perform computations according to a protocol such that processes do not reveal their respective inputs to each other, and any deviation from an accurate computation by any one of the processes results in a detection of the deviation by at least one of the other processes. Computations in a shared manner as described are known as 'secure multiparty computations'. Two protocols for secure multiparty computations in algebraic rings are described, for which the number of processes is equal to four. Both protocols are time efficient, and require less cost than alternative solutions for detecting malicious parties. Both protocols implement verifiable secret sharing (VSS) schemes. In one protocol a communication of six values between processes per multiplication computation is required, and in a second protocol a communication of five values between processes per multiplication computation is required. When a computation with a large number of multiplications is required, both protocols are highly efficient compared to performance of protocols described in prior art.

According some embodiments of the present invention, a system for secure multiparty computation includes a code, which consists of instructions to manage a preprocessing of inputs, distribution of an outcome of the preprocessing to the processes, and post processing the processes outputs. In a pre-processing stage, the system may receive a record, and/or an arithmetic computation to be performed on the record, as an input. Optionally, the arithmetic computation may be an algebraic formula such as a multivalued polynomial. Optionally, the arithmetic computation may be represented as a logical circuit, in which each gate has a functionality consisting of one of: a multiplication of an input by a scalar, a summation of two inputs, and a multiplication of two inputs.

In some embodiments of the present invention, the code instructs one or more processor(s) to split the record in a random manner into a plurality of components, such that a summation of the plurality of components results in the record. Optionally, the code instructs the one or more processor(s) to assign a partial record, also known hereby as a 'secret share', for each process such that no two partial records are identical, and such that the plurality of different components of partial records are arithmetically reconstructable from a union of any two of the assigned partial records. For example, if for a record x, x=1, then x may be split into $(x_1,x_2,x_3,x_4)=(0.25,0.25,0.2,0.3)$, and for each process $P_i$, i=1 ... 4, a partial record consisting of $(x_i,x_{(i+1) mod\ 4},x_{(i+2) mod\ 4})$ may be assigned.

According some embodiments of the present invention, the code instructs one or more processor(s) to assign each process a set of seeds designated for generation of cryptographic keys and encryption factors for a purpose of secure communication between any two processes, and for a purpose of secure verification of integrity of components resulting from stepwise computations of the arithmetic computation.

According to some embodiments of the present invention, each process executes a computation scheme on a respective assigned partial record, wherein for gates comprising of multiplications of two inputs each process uses assigned seeds to share encrypted pre determined computations with other processes. Optionally, the computation scheme is repeated for each gate of the logical circuit, and each process creates a respective processed partial record from executing the computation scheme at each gate. According some embodiments of the present invention, at each gate of the logical circuit, a respective computation applied to an input of the gate may be equal to a summation of different respective processed partial record components of at least two processes.

According some embodiments of the present invention, following computations of processed partial records for each gate of the logical circuit, a verification of integrity of all processed partial records resulting from multiplicative gates is executed by all processes. Optionally, the verification of integrity procedure is executed by broadcasting predetermined combined encryptions of processed partial record components multiplied by cryptographic keys, followed by verifying equations containing generated and received combined encryptions, such that with a high probability integrities of all processed partial record components computed for all multiplicative gates of the logical circuit are validated correctly.

Embodiments of both protocols may display the following advantages:

1. Communications between processes may be masked by a hash function such that no new knowledge is revealed.

2. As long as up to one process deviates from a protocol, at least one other process detects the deviation, by exploiting that according to both protocols, at least one other party can generate communications that a process receives.

3. A multiple amount of verification terms (also known as processed partial record components) may be aggregated in each verification equation such that each verification term is multiplied by a random generated encryption factor, so an equality of a verification equation means with high probability that each verification term is equal to a respective verification term to be validated.

4. Verifications may be repeated for different values within the algebraic ring, thus increasing the probabilities for correct validations.

5. All verifications for a given logical circuit may be executed simultaneously, thus complexity of the protocols do not increase by much when a number of multiplications which need verifying is large.

Secure multiparty computations have been implemented in prior art which demonstrate drawbacks in relation to some embodiments of the present invention. Reference is made to "Verifiable Secret Sharing and Multiparty Protocols with Honest Majority" by T. Rabin and M. Ben-Or. Published at STOC '89 Proceedings of the twenty-first annual ACM symposium on Theory of computing pp. 73-85 on May 17, 1989, which describes a protocol for secure multiparty computations that achieves semi-honest security, meaning the protocol described thereof is secure only when all parties follow the protocol. Reference is also made to "Multiparty Computation from Somewhat Homomorphic Encryption" by I. Damgård, V. Pastro, N. P. Smart, and S. Zakarias. Published at CRYPTO 2012 Proceedings of the 32nd Annual Cryptology Conference on Advances in Cryptology Volume 7417 pp. 643-662 on Aug. 23, 2012, which describes a protocol for secure multiparty computations that is secure against malicious parties which do not follow the protocol but requires significant computational complexity. Reference is also made to "Optimized Honest-Majority MPC for Malicious Adversaries—Breaking the 1 Billion-Gate Per Second Barrier" by T. Araki, A. Barak, J. Furukawa, T. Lichter, Y. Lindell, A. Nof, K. Ohara, A. Watzman, and O. Weinstein. Published at IEEE Symposium on Security and Privacy 2017 pp. 843-862 on Jun. 26, 2017, which describes a protocol for secure multiparty computations which is secure against parties which deviate from the protocol. The protocol can detect such deviations and terminate, however the protocol requires a large amount of computations shared among processes, and is feasible only when an amount of computations is very large, for example, the protocol would require at least four times the computational complexity in comparison to semi honest protocols.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
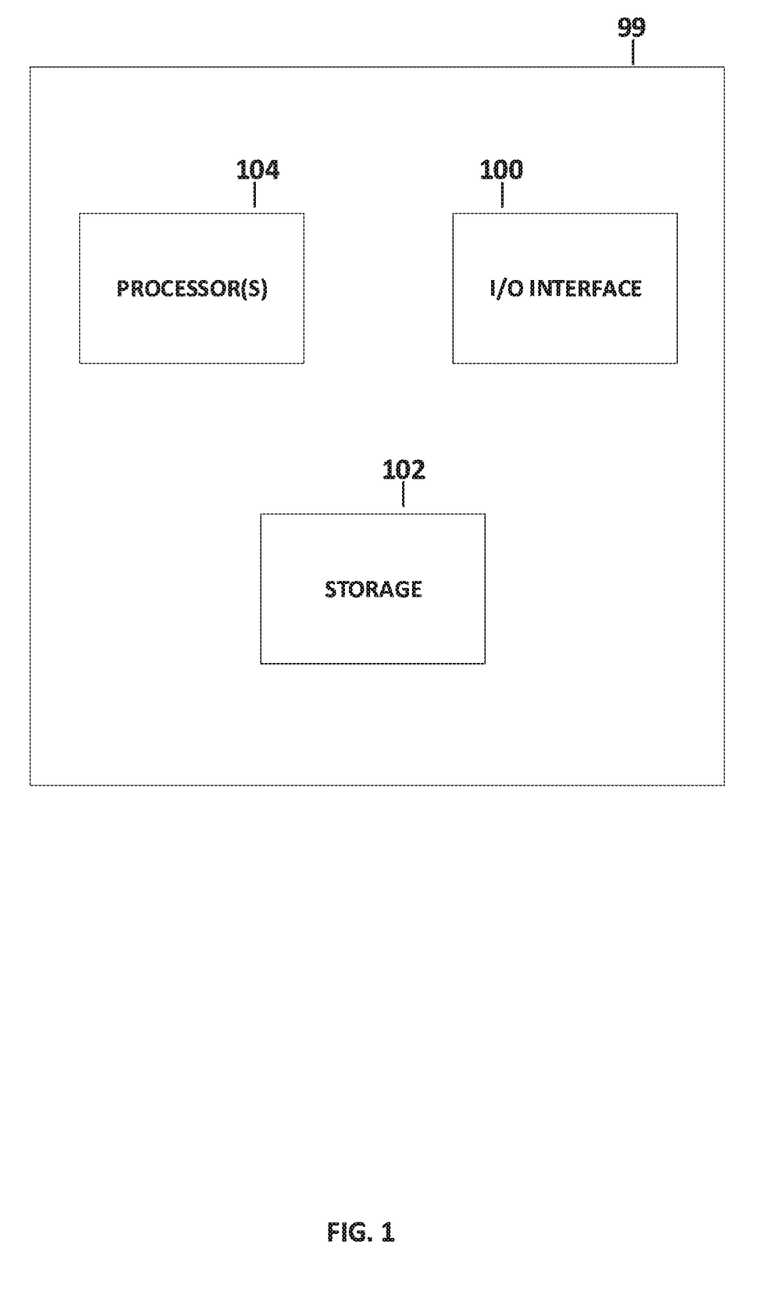
FIG. 1 is an exemplary layout of the various system components, according to some embodiments of the present invention.

Reference is now made to FIG. 1, which according to some embodiments of the present invention, depicts components of a secure multiparty computation system 99. An I/O interface 100, receives as inputs records, arithmetic computations to be executed on respective records, and outputs the outcomes of secure multiparty computations. A storage 102 is included in order to store data such as partial computations originating during applications of arithmetic computations to records, and such as cryptographic data, for example, hash tables. In addition the storage contains a code for performing the two protocols of secure multiparty computations described herein, wherein the code consists of instructions for initiating processes, assigning partial records and seeds to each process, and instructing each process how to perform a respective computation. One or more processor(s) 104 is included in the system 99, in order to execute instructions in the code stored in the storage 102.

Figure 2:
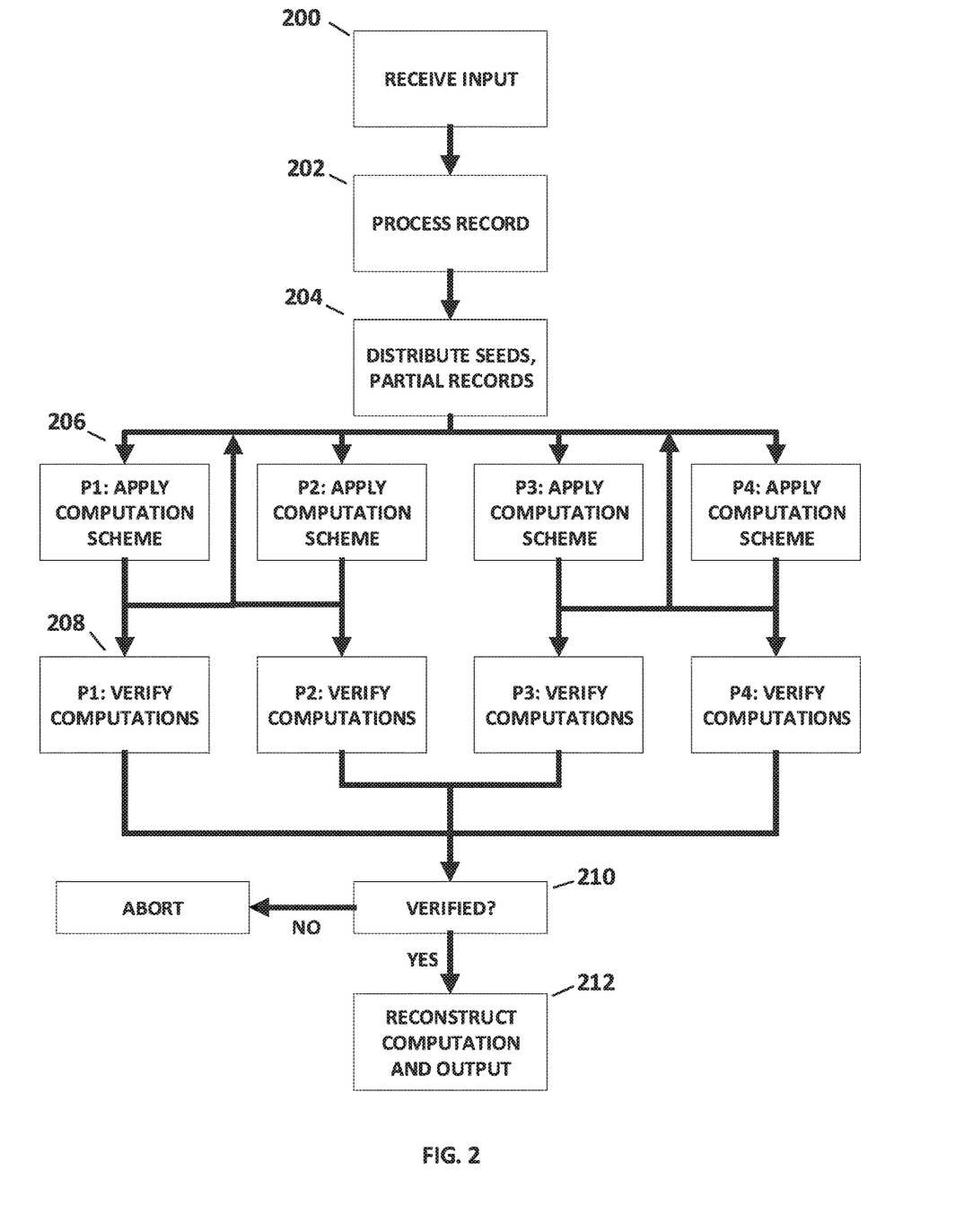
FIG. 2 is an exemplary flowchart of a dataflow of a secure multiparty computation on an input, according to some embodiments of the present invention.

Reference is now made to FIG. 2, which depicts a dataflow of a secure multiparty computation on an input, according to some embodiments of the present invention. As shown in 200, an input is received by the system 99, through the I/O interface 100. Optionally, the input may comprise of a record and an arithmetic computation, which may be received in a form of a logical circuit. As shown in 202, the record is processed, by splitting the record randomly into distinct parts, such that a summation of the parts results in the record, and computing partial records. Optionally, further processing may be executed, such as transforming the arithmetic computation, and generating a hash function and seeds. As shown in 204, the seeds and partial records are distributed to the processes. As shown in 206, each of four processes executes iteratively a computation scheme on the arithmetic computation. Optionally, the iterations are performed on gates of a logical circuit representing the arithmetic computation, such that outputs of each process at each gate serve as partial record inputs for a following gate. As shown in 208, upon completion of execution of the computation scheme, each process of the four processes may verify processed partial records components produced by the processes during execution of the computation scheme by executing a verification procedure. As shown in 210, if any of the verifications by the processes during execution of the verification procedure is not valid the system 99 may abort the application of the arithmetic computation to the record. As shown in 212, in the case that all verifications are valid, the system 99 may reconstruct the application of the arithmetic computation to the record by combining processed partial records of the four processes which may be outputted by the computation scheme. According to some embodiments of the present invention, the system 99 proceeds to output the application of the arithmetic computation to the record through the I/O interface 100.

According to some embodiments of the present invention, following the dataflow in FIG. 2, a first protocol for secure multiparty computation may receive an input containing a record, denoted by R, and split the record randomly into four parts $(r_1,r_2,r_3,r_4)$, such that $R=r_1+r_2+r_3+r_4$. The first protocol may assign each process a partial record such that process $P_i$, i=1 . . . 4 may be assigned $(r_i, r_{(i+1)mod(4)}, r_{(i+2)mod(4)})$. In addition, the first protocol may assign each process with three seeds from $(seed_1, seed_2, seed_3, seed_4)$, such that $P_i$, i=1 . . . 4 may be assigned $(seed_i, seed_{(i+1)mod(4)}, seed_{(i+2)mod(4)})$.

Figure 3:
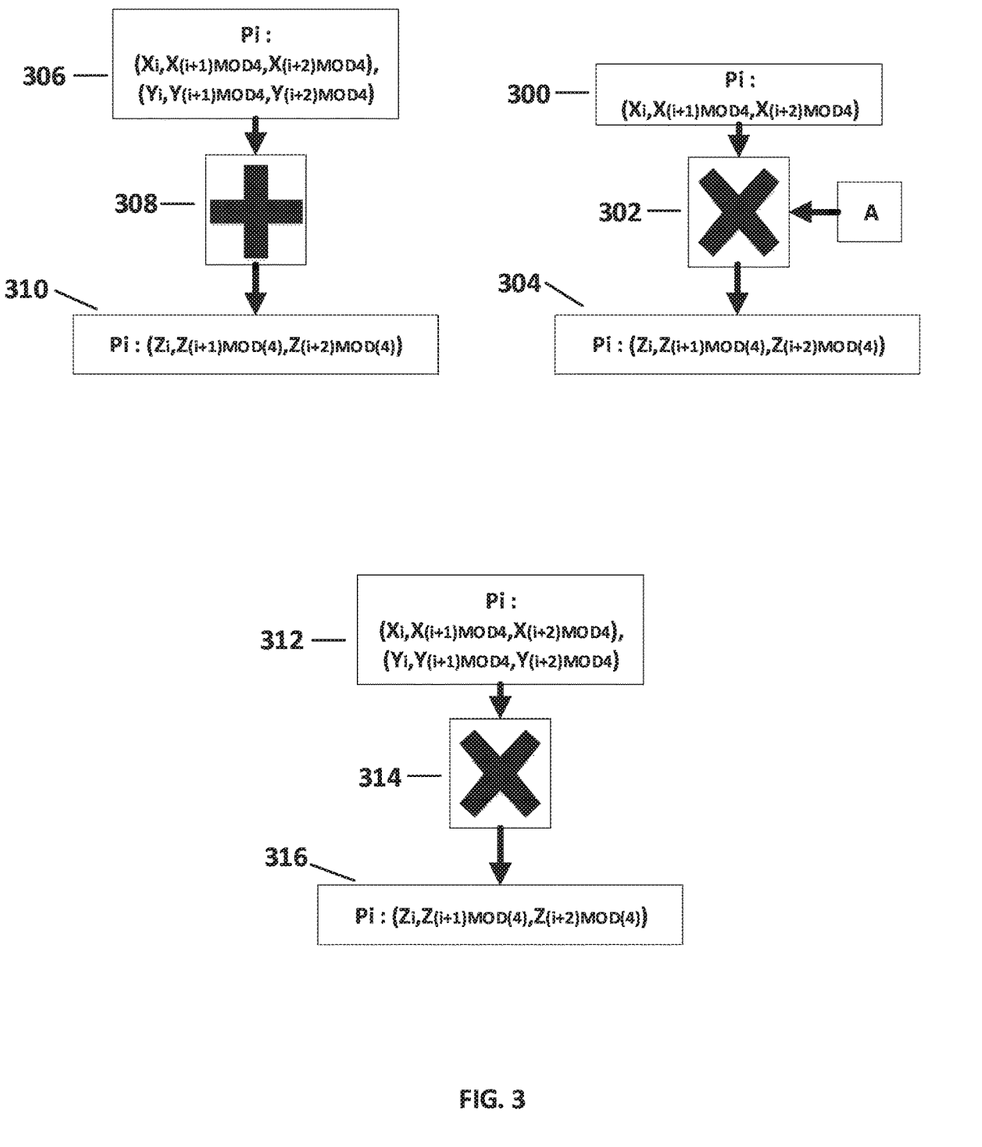
FIG. 3 is a depiction of inputs and outputs of processes following the first protocol, in relation to three possible types of gates that may be contained in a logical circuit representing an arithmetic computation, according to some embodiments of the present invention.

Reference is now made to FIG. 3, which depicts inputs and outputs of processes following the first protocol, in relation to three possible types of gates that may be contained in a logical circuit representing an arithmetic computation, according to some embodiments of the present invention. As seen in FIG. 3, each process $P_i$, i=1 . . . 4 outputs $(z_i, z_{(i+1)mod(4)}, z_{(i+2)mod(4)})$ at each of the gate types, wherein the values outputted differ as follows. As shown in 300 and 302, for a gate whose functionality is a multiplication by a scalar A, an input for $P_i$, i=1 . . . 4 is given as $(x_i, x_{(i+1)mod(4)}, x_{(i+2)mod(4)})$, whereas, as shown in 304, each $P_i$, i=1 . . . 4 performs a computation defined by: $(z_i, z_{(i+1)mod(4)}, z_{(i+2)mod(4)}) = (Ax_i, Ax_{(i+1)mod(4)}, Ax_{(i+2)mod(4)})$. Note that $AX=z_1+z_2+z_3+z_4$. As shown in 306 and 308, for a gate whose functionality is an summation of two inputs denoted by $X=(x_1,x_2,x_3,x_4)$, $Y=(y_1,y_2,y_3,y_4)$, an input for $P_i$, i=1 . . . 4 is given as $(x_i, x_{(i+1)mod(4)}, x_{(i+2)mod(4)})$, $(y_i, y_{(i+1)mod(4)}, y_{(i+2)mod(4)})$, whereas, as shown in 310, each $P_i$, i=1 . . . 4 performs a computation defined by: $(z_i, z_{(i+1)mod(4)}, z_{(i+2)mod(4)}) = (x_i+y_i, x_{(i+1)mod(4)}+y_{(i+1)mod(4)}, x_{(i+2)mod(4)}+y_{(i+2)mod(4)})$. Note that $X+Y=z_1+z_2+z_3+z_4$. As shown in 312 and 314, for a gate whose functionality is a multiplication of two inputs, denoted by $X=(x_1,x_2,x_3,x_4)$, $Y=(y_1,y_2,y_3,y_4)$, an input for $P_i$, i=1 . . . 4 is given as $(x_i, x_{(i+1)mod(4)}, x_{(i+2)mod(4)})$, $(y_i, y_{(i+1)mod(4)}, y_{(i+2)mod(4)})$. Denote by H a hash function such that H: (ID,k,SEED)→ $\Re$ where ID, is an identifier, k is an optional security parameter, SEED=$seed_j$, j∈{1 . . . 4}, and $\Re$ is an algebraic ring. According to some embodiments of the present invention, an implementation of H, wherein sid may be an identifier shared by all the processes, may be used to generate cryptographic keys and encryption factors.

Referring to 316, each $P_i$, i=1 . . . 4 may perform a computation defined as follows:

P1 computes:

$w_1=x_1y_1+x_1y_2+x_2y_1+H(sid,1,seed_1)-H(sid,1,seed_2)-H(sid,2,seed_1)$ $w_2=x_2y_2+x_2y_3+x_3y_2+H(sid,1,seed_2)-H(sid,1,seed_3)-H(sid,2,seed_2)$ $v_1=x_1y_3+x_3y_1+x_2y_1+H(sid,2,seed_1)+H(sid,2,seed_3)$ P2 computes:

$w_2=x_2y_2+x_2y_3+x_3y_2+H(sid,1,seed_2)-H(sid,1,seed_3)-H(sid,2,seed_2)$ $w_3=x_3y_3+x_3y_4+x_4y_3+H(sid,1,seed_3)-H(sid,1,seed_4)-H(sid,2,seed_3)$ $v_2=x_2y_4+x_4y_2+H(sid,2,seed_2)+H(sid,2,seed_4)$ P3 computes:

$w_3=x_3y_3+x_3y_4+x_4y_3+H(sid,1,seed_3)-H(sid,1,seed_4)-H(sid,2,seed_3)$ $w_4=x_4y_4+x_4y_1+x_1y_4+H(sid,1,seed_4)-H(sid,1,seed_1)-H(sid,2,seed_4)$ $v_1=x_1y_3+x_3y_1+x_2y_1+H(sid,2,seed_1)+H(sid,2,seed_3)$ P4 computes:

$w_4=x_4y_4+x_4y_1+x_1y_4+H(sid,1,seed_4)-H(sid,1,seed_1)-H(sid,2,seed_4)$ $w_1=x_1y_1+x_1y_2+x_2y_1+H(sid,1,seed_1)-H(sid,1,seed_2)-H(sid,2,seed_1)$ $v_2=x_2y_4+x_4y_2+H(sid,2,seed_2)+H(sid,2,seed_4)$ The results of the computations $\{w_1, \ldots w_4\}$, $\{v_1, v_2\}$ are processed partial records components of each respective process.

Figure 4:
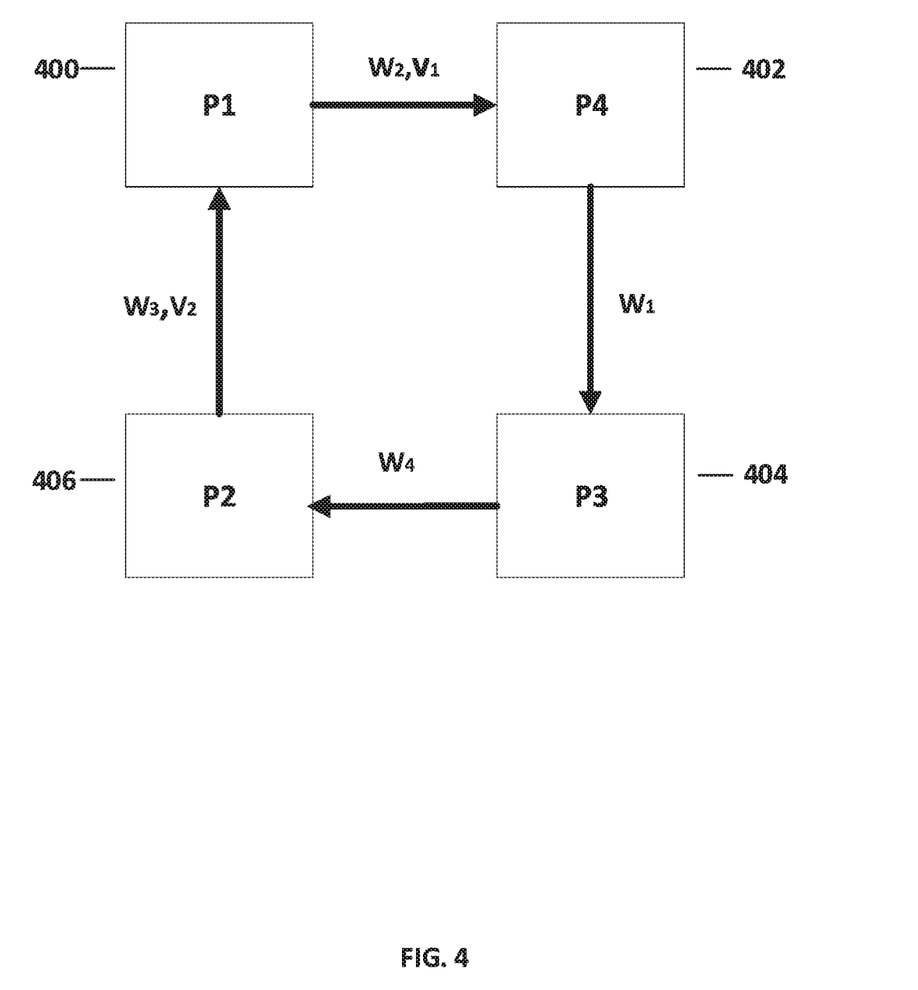
FIG. 4 is an exemplary depiction of communications of processed partial record components between the processes following the first protocol, according to some embodiments of the present invention.

Reference is now made to FIG. 4, which depicts communications of processed partial record components between the processes following the first protocol, according to some embodiments of the present invention, such that each process may assemble a respective processed partial record. Each process sends components to a designated process as depicted in 400, 402, 404, and 406. Next, each process $P_i$, i=1 . . . 4 may assemble a processed partial record as follows:

$P_1$ computes $(z_1,z_2,z_3)=(w_1+v_1,w_2+v_2,w_3)$.
$P_2$ computes $(z_2,z_3,z_4)=(w_2+v_2,w_3,w_4)$.
$P_3$ computes $(z_3,z_4,z_1)=(w_3,w_4,w_1+v_1)$.
$P_4$ computes $(z_4,z_1,z_2)=(w_4,w_1+v_1,w_2+v_2)$.
Note that $XY=z_1+z_2+z_3+z_4$.

Figure 5:
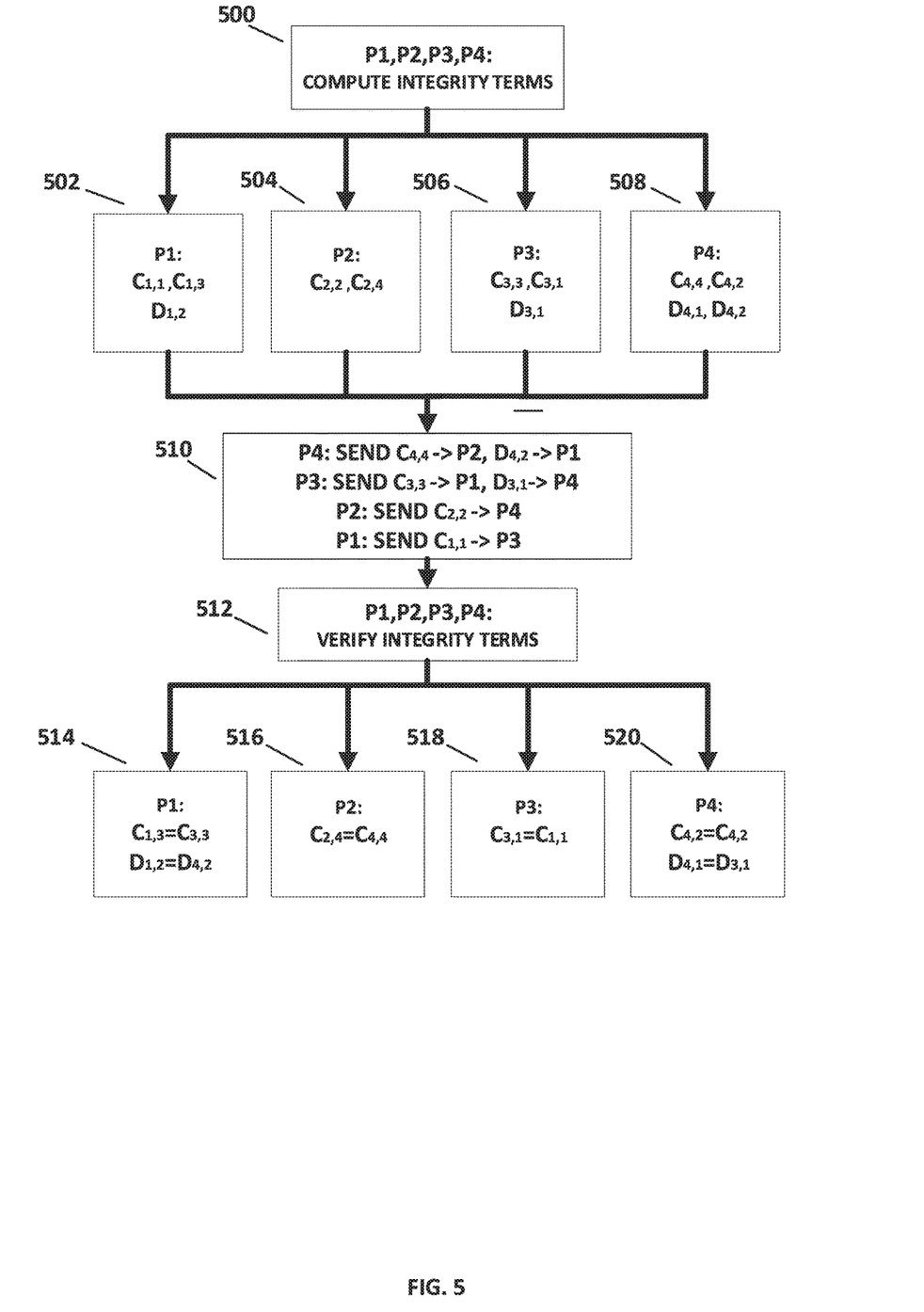
FIG. 5 is an exemplary depiction of depicts a dataflow of a verification procedure of the first protocol, according to some embodiments of the present invention.

Reference is now made to FIG. 5, which depicts a dataflow of a verification procedure of the first protocol, according to some embodiments of the present invention. As shown in 500, each process receives an instruction to compute integrity terms.

Denote by $(x_j,y_j,z_j)$, j=1 . . . C, a set of the inputs and output of all j-th multiplication gates in the logical circuit, and denote by $(z_j)$, j=C+1 . . . C+I a set of inputs to the circuit. Denote by $(z_{j,i,i}, z_{j,i,(i+1)mod(4)}, z_{j,i,(i+2)mod(4)})$, j=1 . . . C+I, i=1 . . . 4, a processed partial record of $P_i$ resulting from $z_j$, and denote by $(w_{j,i,i}, w_{j,i,(i+1)mod(4)}, w_{j,i,(i+2)mod(4)}, v_{j,i,1}$ or $v_{j,i,2})$, j=1 . . . C+I, i=1 . . . 4, be what $P_i$ computes or receives as $(w_i, w_{(i+1)mod(4)}, w_{(i+2)mod(4)}, v_1$ or $v_2)$ for computing a processed partial record resulting from $z_j$. Optionally, following computations of all processed partial records from $z_j$, j=1 . . . C+I, the processes agree on a random number denoted as coin.

As shown in 502, 504, 506, and 508 each process computes integrity terms as follows:

$P_1$ computes:

$$C_{1,k} = \sum_{j=1}^{C+I} H(\text{coin}, j) w_{j,1,k}, k = 1, 3$$

-continued $$D_{1,2} = \sum_{j=1}^{C+I} H(\text{coin}, j)v_{j,1,2}$$

$P_2$ computes:

$$C_{2,k} = \sum_{j=1}^{C+I} H(\text{coin}, j)w_{j,2,k}, k = 2, 4$$

$P_3$ computes:

$$C_{3,k} = \sum_{j=1}^{C+I} H(\text{coin}, j)w_{j,3,k}, k = 3, 1$$

$$D_{3,1} = \sum_{j=1}^{C+I} H(\text{coin}, j)v_{j,3,1}$$

$P_4$ computes:

$$C_{4,k} = \sum_{j=1}^{C+I} H(\text{coin}, j)w_{j,2,k}, k = 4, 2$$

$$D_{4,k} = \sum_{j=1}^{C+I} H(\text{coin}, j)v_{j,4,k}, k = 2, 1$$

As shown in 510, terms are communicated between processes. As shown in 512, each process proceeds to verify designated integrity terms. As shown in 514, $P_1$ checks that $C_{1,3}=C_{3,3}$, and that $D_{1,2}=D_{4,2}$, which verifies that terms received by $P_1$ from $P_2$ as $w_{j,2}$ may be constructed by $P_3$, and that terms received by $P_1$ from $P_2$ as $v_{j,2}$ may be constructed by $P_4$. As shown in 516, $P_2$ checks that $C_{2,4}=C_{4,4}$, which verifies that terms received by $P_2$ from $P_3$ as $w_{j,3}$ may be constructed by $P_4$. As shown in 518, $P_3$ checks that $C_{1,1}=C_{3,1}$, which verifies that terms received by $P_3$ from $P_4$ as $w_{j,4}$ may be constructed by $P_1$. As shown in 520, $P_4$ checks that $D'_{3,1}-D'_{2,2}=C_{4,1}$, which verifies that terms received by $P_4$ from $P_1$ may be constructed by $P_2$ and $P_3$ collaboratively, $P_4$ checks that $C_{2,2}=C_{4,2}$, and that $D_{3,1}=D_{4,1}$, which verifies that terms received by $P_4$ from $P_1$ as $w_{j,1}$ may be constructed by $P_1$, and that terms received by $P_4$ from $P_1$ as $v_{j,1}$ may be constructed by $P_3$.

If any of the verifications are not valid, the processes abort the first protocol.

Optionally, in order to increase probability of valid verifications, all processes repeat the verification procedure N times, each with a different value for coin, whereas if $\Re$ is a field of size K, and |k| is a range of the security parameter k, N may be chosen such that $K^N > 2^{|k|}$, and if $\Re$ is a modulo integer ring then N may be chosen as N=|k|.

According to some embodiments of the present invention, following the dataflow in FIG. 2, a second protocol for secure multiparty computation may receive an input containing a record, denoted by R, and split the record randomly into three parts $(r_1,r_2,r_3)$, such that $R=r_1+r_2+r_3$. The second protocol assigns each process a partial record such that process $P_1$ is assigned $(r_1,r_2)$, such that process $P_2$ is assigned $(r_2,r_3)$, such that process $P_3$ is assigned $(r_3,r_1)$, and such that process $P_4$ is assigned $(r_1-r_2,r_2-r_3)$.

The second protocol assigns each process with three seeds from SEED={$\text{seed}_1,\text{seed}_2,\text{seed}_3,\text{seed}'_1,\text{seed}'_2,\text{seed}'_3$}, such that $P_1$ is assigned ($\text{seed}_1,\text{seed}_2,\text{seed}'_1,\text{seed}'_2,\text{seed}'_3$), such that $P_2$ is assigned ($\text{seed}_2,\text{seed}_3,\text{seed}'_1,\text{seed}'_2,\text{seed}'_3$), such that $P_3$ is assigned ($\text{seed}_3,\text{seed}_1,\text{seed}'_1,\text{seed}'_2,\text{seed}'_3$), and such that $P_4$ is assigned ($\text{seed}_1,\text{seed}_2,\text{seed}_3$).

Figure 6:
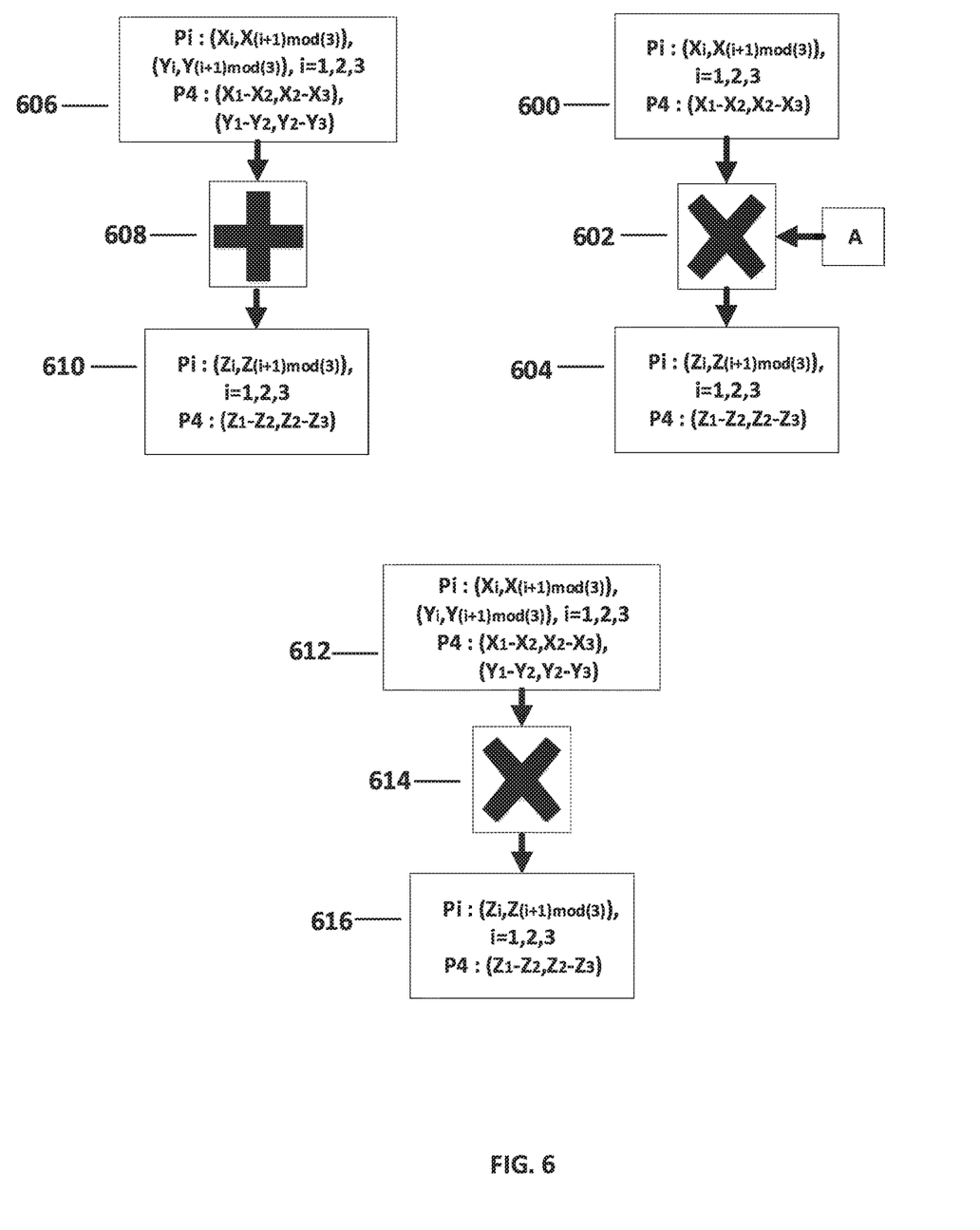
FIG. 6 is a depiction of inputs and outputs of processes following the second protocol, in relation to three possible types of gates that may be contained in a logical circuit representing an arithmetic computation, according to some embodiments of the present invention.

Reference is now made to FIG. 6, which is a depiction of inputs and outputs of processes following the second protocol, in relation to three possible types of gates that may be contained in a logical circuit representing an arithmetic computation, according to some embodiments of the present invention. As seen in FIG. 6, each process $P_i$, i=1 . . . 3 outputs $(z_i,z_{(i+1)mod(3)})$, and $P_4$ outputs $(z_1-z_2,z_2-z_3)$, at each of the gate types, wherein the values outputted differ as follows.

As shown in 600 and 602, for a gate whose functionality is a multiplication by a scalar A, an input for $P_i$, i=1 . . . 3 is given as $(x_i,x_{(i+1)mod(3)})$, and an input for $P_4$ is given as $(x_1-x_2,x_2-x_3)$. As shown in 604, each $P_i$, i=1 . . . 3 performs a computation defined by: $(z_i,z_{(i+1)mod(3)})=(Ax_i, Ax_{(i+1)mod(3)})$, and $P_4$ computes $(A(x_1-x_2), A(x_2-x_3))$. Note that $AX=z_1+z_2+z_3$. As shown in 606 and 608, for a gate whose functionality is an summation of two inputs denoted by $X=(x_1,x_2,x_3)$, $Y=(y_1,y_2,y_3)$, an input for $P_i$, i=1 . . . 3 is given as $(x_i,x_{(i+1)mod(3)})$, $(y_i,y_{(i+1)mod(3)})$, and an input for $P_4$ is given as $(x_1-x_2,x_2-x_3)$, $(y_1-y_2,y_2-y_3)$. As shown in 610, each $P_i$, i=1 . . . 3 computes $(z_i,z_{(i+1)mod(3)})=(x_i+y_i, x_{(i+1)mod(3)}+y_{(i+1)mod(3)})$, and $P_4$ computes $(z_1-z_2,z_2-z_3)=(x_1-x_2+y_1-y_2,x_2-x_3+y_2-y_3)$. Note that $X+Y=z_1+z_2+z_3$.

As shown in 612 and 614, for a gate whose functionality is a multiplication of two inputs, denoted by X, Y and inputs for $P_i$, i=1 . . . 4 as described for the summation of inputs. According to some embodiments of the present invention, an implementation of H, wherein sid may be an identifier shared by all the processes, may be used to generate cryptographic keys and encryption factors.

Referring to 614, 616, each $P_i$, i=1 . . . 4 may perform a computation defined as follows:

P1 computes:

$u_1 = x_1y_1 + H(sid, seed'_1) - H(sid, seed'_2)$ $u_2 = x_2y_2 + H(sid, seed'_2) - H(sid, seed'_3)$ $z_1 = (x_1 + x_2)(y_1 + y_2) - x_1y_1 + H(sid, seed_1) -$ $\qquad H(sid, seed_2) - H(sid, seed'_1) - H(sid, seed'_2)$ $u_2 = u_2 - u_2$ P2 computes:

$u_2 = x_2y_2 + H(sid, seed'_2) - H(sid, seed'_3)$ $u_3 = x_3y_3 + H(sid, seed'_3) - H(sid, seed'_1)$ $z_2 = (x_2 + x_3)(y_2 + y_3) - x_2y_2 + H(sid, seed_2) -$ $\qquad H(sid, seed_3) - H(sid, seed'_2) - H(sid, seed'_3)$ $v_2 = u_2 - u_3$ P3 computes:

$u_3 = x_3y_3 + H(sid, seed'_3) - H(sid, seed'_1)$ $u_1 = x_1y_1 + H(sid, seed'_1) - H(sid, seed'_2)$ $z_3 = (x_3 + x_1)(y_3 + y_1) - x_3y_3 + H(sid, seed_3) -$ $\qquad H(sid, seed_1) - H(sid, seed'_3) - H(sid, seed'_1)$ $v_3 = u_3 - u_1$ P4 computes:

$w_1 = z_1 - z_2 - v_1 - v_2 =$ $\qquad z_1 - z_2 - u_1 + u_3 = -(x_1 - x_2)(y_1 - y_2) + (x_2 - x_3)(y_2 - y_3) +$ -continued $$H(sid, seed_1) - 2H(sid, seed_2) + H(sid, seed_3)$$

$$w_2 = z_2 - z_3 - v_2 - v_3 = z_2 - z_3 - u_2 + u_1 =$$
$$-(x_2 - x_3)(y_2 - y_3) + (x_3 - x_1)(y_3 - y_1) +$$
$$H(sid, seed_2) - 2H(sid, seed_3) + H(sid, seed_1)$$

$$w_3 = z_3 - z_1 - v_3 - v_1 = z_3 - z_1 - u_3 + u_2 =$$
$$-(x_3 - x_1)(y_3 - y_1) + (x_1 - x_2)(y_1 - y_2) +$$
$$H(sid, seed_3) - 2H(sid, seed_1) + H(sid, seed_2)$$

Note that:

$$x_3 - x_1 = -(x_1 - x_2) - (x_2 - x_3) \text{ and } y_3 - y_1 = -(y_1 - y_2) - (y_2 - y_3)$$

The results of the computations are processed partial records components of each respective process.

Figure 7:
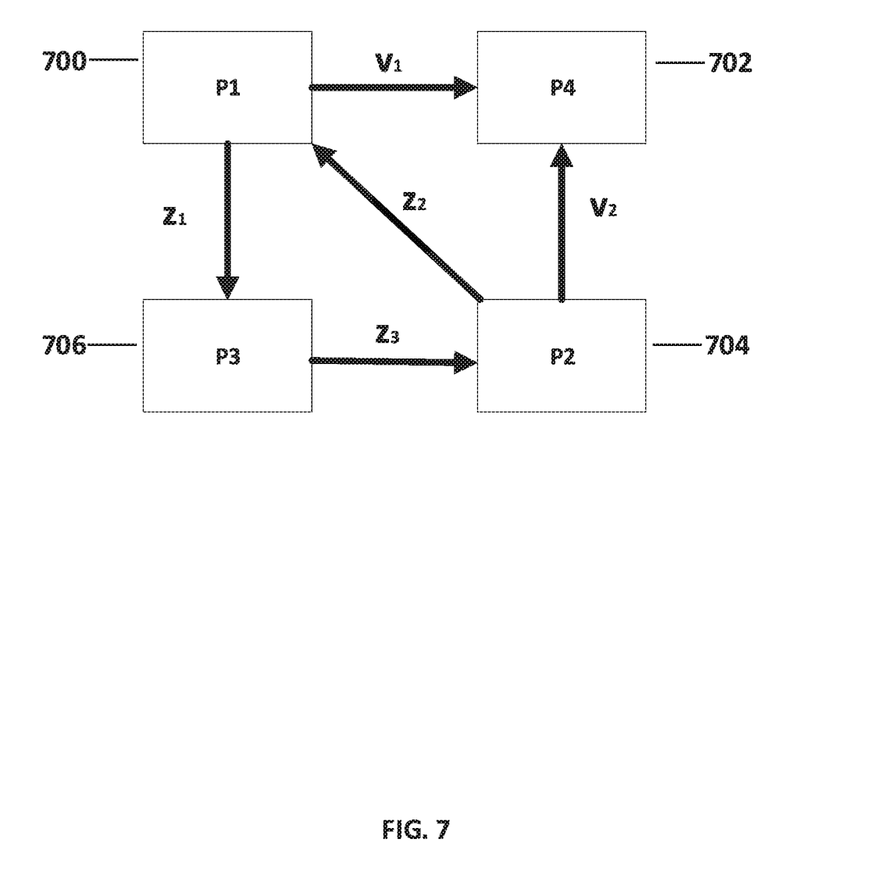
FIG. 7 is an exemplary depiction of communications of processed partial record components between the processes following the second protocol, according to some embodiments of the present invention.

Reference is now made to FIG. 7, which exemplary depiction of communications of processed partial record components between the processes following the second protocol, according to some embodiments of the present invention. Each process sends components to a designated process as depicted in 700,702,704, and 706. Next, each process $P_i$, i=1 ... 4 assembles a processed partial record as follows:

$P_1$ computes $(z_1, z_2)$.
$P_2$ computes $(z_2, z_3)$.
$P_3$ computes $(z_3, z_1)$.
$P_4$ computes $(z_1-z_2, z_2-z_3) = (w_1+v_1+v_2, w_2+v_2+v_3)$.

Note that $XY = z_1 + z_2 + z_3$.

Figure 8:
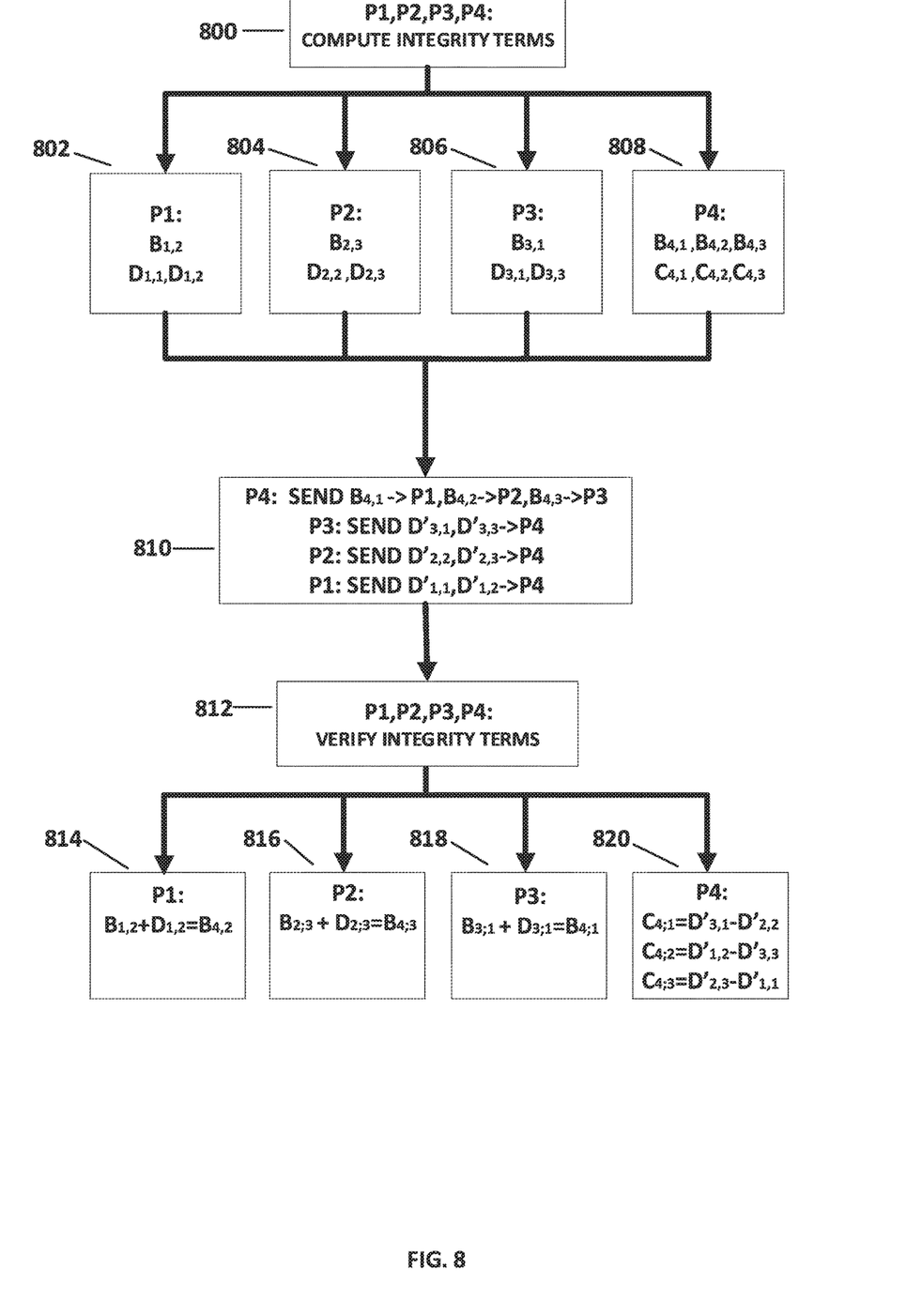
FIG. 8 is an exemplary depiction of depicts a dataflow of a verification procedure of the second protocol, according to some embodiments of the present invention.

Reference is now made to FIG. 8, which depicts a dataflow of a verification procedure of the first protocol, according to some embodiments of the present invention. As shown in 800, each process may receive an instruction to compute integrity terms.

Denote by $(x_j, y_j, z_j)$, j=1 ... C, a set of the inputs and output of all j-th multiplication gates in the logical circuit, and denote by $(z_j)$, j=C+1 ... C+I a set of inputs to the circuit. For j=1 ... C+I, denote by $(z_{j,1,1}, z_{j,1,2})$, $(z_{j,2,2}, z_{j,2,3})$, $(z_{j,3,3}, z_{j,3,1})$, $(z_{j,4,4}, z_{j,4,5})$, processed partial records of $P_1$, $P_2$, $P_3$, and $P_4$, respectively resulting from $z_j$, and denote by $z_{j,4,6} = -z_{j,4,4} - z_{j,4,5}$. Denote by $v_{j,1,1}$, $v_{j,2,2}$, $v_{j,3,3}$, and $(v_{j,4,1}, v_{j,4,2}, w_{j,4,1}, w_{j,4,2}, w_{j,4,3})$ to respectively represent $v_1$, $v_2$, $v_3$, and $(v_1, v_2, w_1, w_2, w_3)$ which $P_1$, $P_2$, and $P_4$ compute or receive for computing a processed partial record resulting from $z_j$. Denote by $(u_{j,1,1}, u_{j,1,2})$, $(u_{j,2,2}, u_{j,2,3})$, and $(u_{j,3,3}, u_{j,3,1})$, to respectively represent $(u_1, u_2)$, $(u_2, u_3)$, and $(u_3, u_1)$ which $P_1$, $P_2$, and $P_3$ compute or receive for computing a processed partial record resulting from $z_j$. Optionally, following computations of all processed partial records from $z_j$, j=1 ... C+I, the processes agree on a random number denoted as coin. As shown in 802,804,806, and 808 each process may compute integrity terms as follows:

$P_1$ computes:

$$B_{1,2} = \sum_{j=1}^{C+I} H(\text{coin}, j) z_{j,1,2}$$

$$D_{1,k} = \sum_{j=1}^{C+I} H(\text{coin}, j) u_{j,1,k}, k = 1, 2$$

$P_2$ computes:

$$B_{2,3} = \sum_{j=1}^{C+I} H(\text{coin}, j) z_{j,2,3}$$

$$D_{2,k} = \sum_{j=1}^{C+I} H(\text{coin}, j) u_{j,2,k}, k = 2, 3$$

$P_3$ computes:

$$B_{3,1} = \sum_{j=1}^{C+I} H(\text{coin}, j) z_{j,3,1}$$

$$D_{3,k} = \sum_{j=1}^{C+I} H(\text{coin}, j) u_{j,3,k}, k = 3, 1$$

$P_4$ computes:

$$B_{4,i} = \sum_{j=1}^{C+I} H(\text{coin}, j) z_{j,4,i+3} + H(sid, seed_i) - H(sid, seed_{i+1}),$$

$$i = 1, 2, 3$$

$$C_{4,1} = \sum_{j=1}^{C+I} H(\text{coin}, j) v_{j,4,1}$$

$$C_{4,2} = \sum_{j=1}^{C+I} H(\text{coin}, j) v_{j,4,2}$$

$$C_{4,3} = \sum_{j=1}^{C+I} H(\text{coin}, j) v_{j,4,3}$$

As shown in 810, terms are communicated between processes where $D'_{3,1} = D_{3,1} + H(sid, seed'_3)$, $D'_{2,2} = D_{2,2} - H(sid, seed'_3)$, $D'_{1,2} = D_{1,2} + H(sid, seed'_1)$, $D'_{3,3} = D_{3,3} - H(sid, seed'_1)$, $D'_{2,3} = D_{2,3} + H(sid, seed'_2)$, and $D'_{1,1} = D_{1,1} - H(sid, seed'_2)$. As shown in 812, each process proceeds to verify designated integrity terms. As shown in 814, $P_1$ checks that $B_{1,2} + D_{1,2} = B_{4,2}$, which verifies that terms received by $P_1$ from $P_2$ may be constructed by $P_4$ and $P_1$ collaboratively. Next, as shown in 816, $P_2$ checks that $B_{2,3} + D_{2,3} = B_{4,3}$, which verifies that terms received by $P_2$ from $P_3$ may be constructed by $P_4$ and $P_2$ collaboratively. Next, as shown in 818, $P_3$ checks that $B_{3,1} + D_{3,1} = B_{4,1}$, which verifies that terms received by $P_3$ from $P_1$ may be constructed by $P_4$ and $P_3$ collaboratively. Next, as shown in 820, $P_4$ checks that $D'_{3,1} - D'_{2,2} = C_{4,1}$, which verifies that terms received by $P_4$ from $P_1$ may be constructed by $P_2$ and $P_3$ collaboratively, $P_4$ checks that $D'_{1,2} - D'_{3,3} = C_{4,2}$, which verifies that terms received by $P_4$ from $P_2$ may be constructed by $P_3$ and $P_1$ collaboratively, and $P_4$ checks that $D'_{2,3} - D'_{1,1} = C_{4,3}$, which verifies consistency of computations.

If any of the verifications are not valid, the processes abort the second protocol.

Optionally, in order to increase probability of valid verifications, all processes repeat the verification procedure N times, each with a different value for coin, whereas if $\Re$ is a field of size K, and $|k|$ is a range of the security parameter k, N may be chosen such that $K^N > 2^{|k|}$, and if $\Re$ is a modulo integer ring then N may be chosen as $N = |k|$.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term secure multiparty computation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for performing secure computations on records, comprising:
   receiving a request to apply an arithmetic computation on a record;
   assigning a respective partial record of a plurality of partial records of the record to each of a plurality of computational processes;
   instructing each of a plurality of computational processes sharing a computation scheme to perform the following:
      submitting the arithmetic computation to the computation scheme to assemble a processed partial record from the respective partial record components;
      instructing each of the plurality of computational processes to verify an integrity of at least one of the plurality of processed partial records by:
         communicating combined encryptions of one of the plurality of processed partial record components to other of the plurality of computational processes and receiving combined encryptions of the other of the plurality of processed partial record components from the other of the plurality of computational processes, and
         analyzing the received combined encryptions to detect integrity in the other of the processed partial record components; and
   when the detected integrity is valid, receiving processed partial records from at least two of the plurality of computational processes, and calculating a response to the request by combining the received processed partial records.

2. The method of claim 1, further comprising:
   splitting the record in a random manner into a plurality of components, such that a summation of the plurality of components results in the record;
   setting each partial record to be a subset of the plurality of components such that no two assigned subsets are identical; wherein the plurality of components are arithmetically reconstructable from a union of any two of the assigned subsets; and assigning seeds of a plurality of seeds to each computational process of the plurality of computational processes.

3. The method of claim 2, wherein verifying integrity of at least one of the plurality of processed partial records further comprises:
using assigned seeds of the plurality of seeds to generate a plurality of cryptographic keys and encryption factors;
instructing each of the plurality of computational processes to perform:
computing a plurality of integrity terms such that each integrity term comprises summations of multiples of corresponding partial record components and respective generated cryptographic keys and encryption factors;
communicating computed integrity terms to other computational processes;
receiving integrity terms;
verifying received integrity terms by verifying predetermined equations comprising of equations which compare corresponding generated and received integrity terms, or equations which compare summations of integrity terms.

4. The method of claim 3, wherein the arithmetic computation is computed by executing a logical circuit comprises having a plurality of gates; and
a functionality of each of the plurality of gates consists of at least one of the following:
a multiplication of an input by a scalar,
a summation of two inputs, and
a multiplication of two inputs.

5. The method of claim 4, further comprising:
for each gate of the logical circuit which has a functionality of a multiplication of two inputs:
multiplying all pairs of parts of two respective partial records in order to generate a set of multiplied pairs;
using assigned seeds of the plurality of seeds to generate a set of encrypted terms comprising summations of multiplied pairs of the set of multiplied pairs and encryption factors;
sharing encrypted terms between computational processes of the plurality of computational processes in a predetermined manner;
assigning components of a processed partial record to be a set comprising generated and shared encrypted terms and summations of generated and shared encrypted terms.

6. The method of claim 5, wherein the method of secure computation is applied to a logical circuit as follows:
at each of a plurality of gates of the logical circuit, wherein an assigned record to the logical circuit is the record, and an output of each gate of the logical circuit, other than an output gate, is an assigned record for at least one gate of the logical circuit, instructing each of the plurality of computational processes to compute a processed partial record from a respective partial assigned record components, where each computation of the plurality of computational processes corresponds to a functionality of a respective gate, and
following computations of the plurality of computational processes of processed partial records at the output gate, instructing each of the plurality of computational processes to verify an integrity of all of the plurality of processed partial records components computed at all of the plurality of gates of the logical circuit whose functionality comprises a multiplication of two inputs, by other computational processes of the plurality of computational processes.

7. The method of claim 6, wherein the arithmetic computation is performed in a finite algebraic ring, and further comprising:
computing a plurality of values depending on the size of the finite algebraic ring; for each of the plurality of values:
verifying the integrity of all of the plurality of processed partial records components computed at all of the plurality of gates of the logical circuit whose functionality comprises a multiplication of two inputs, comprises generating cryptographic keys and encryption factors which are dependent on each value.

8. The method of claim 7, wherein an amount of the plurality of computational processes is equal to four.

9. The method of claim 8, wherein the computation scheme for each gate of the logical circuit which has a functionality of a multiplication of two inputs shares a total of six different encrypted terms by communication between computational processes.

10. The method of claim 8, wherein the computation scheme for each gate of the logical circuit which has a functionality of a multiplication of two inputs shares a total of five different encrypted terms by communication between computational processes.

11. A system for performing secure computations on records, comprising:
a storage that contains a code;
at least one processor adapted to execute the code for performing the following:
receiving a request to apply an arithmetic computation on a record;
assigning a respective partial record of a plurality of partial records of the record to each of a plurality of computational processes;
instructing each of a plurality of computational processes sharing a computation scheme to perform the following:
submitting the arithmetic computation to the computation scheme to assemble a processed partial record from the respective partial record components;
instructing each of the plurality of computational processes to verify an integrity of at least one of the plurality of processed partial records by:
communicating combined encryptions of one of the plurality of processed partial record components to other of the plurality of computational processes and receiving combined encryptions of the other of the plurality of processed partial record components from the other of the plurality of computational processes, and
analyzing the received combined encryptions to detect integrity in the other of the processed partial record components; and
when the detected integrity is valid, receiving processed partial records from at least two of the plurality of computational processes, and calculating a response to the request by combining the received processed partial records.

* * * * *